United States Patent [19]

Hyde et al.

[11] 4,445,552
[45] May 1, 1984

[54] SAW BLADE CONSTRUCTION USEFUL IN THE CONTINUOUS HARVESTING OF TREES

[75] Inventors: Bruce Hyde; Wayne Tyndall; Dennis Abernethy, all of Prince Albert; Per G. Mellgren, Pointe Claire, all of Canada

[73] Assignee: Prince Albert Pulp Company Limited, Prince Albert, Canada

[21] Appl. No.: 325,250

[22] Filed: Nov. 27, 1981

Related U.S. Application Data

[63] Continuation-in-part of Ser. No. 90,832, Nov. 1, 1981, abandoned.

[51] Int. Cl.³ .............................................. A01G 23/08
[52] U.S. Cl. ................................ 144/3 D; 144/34 R; 144/336
[58] Field of Search ................. 83/928; 144/2 Z, 3 D, 144/34 R, 34 E, 335, 336; 56/14.5, 27.5, 13.9

[56] References Cited

U.S. PATENT DOCUMENTS

| | | |
|---|---|---|
| 1,414,319 | 4/1922 | Zaiauskis . |
| 2,050,952 | 8/1936 | Jaques . |
| 2,312,287 | 2/1943 | Renner . |
| 2,354,625 | 7/1944 | Van Sickle . |
| 2,404,655 | 7/1946 | Randall . |
| 2,411,623 | 11/1946 | Jaques . |
| 2,426,694 | 9/1947 | King . |
| 2,439,607 | 7/1947 | Irwin . |
| 2,462,314 | 2/1949 | Fuqua ................................. 143/43 |
| 2,463,232 | 3/1949 | Zimicki . |
| 2,509,092 | 11/1950 | Faulkner . |
| 2,538,371 | 1/1951 | Le Tourneau . |
| 2,560,641 | 7/1951 | Goodlet . |
| 2,575,696 | 11/1951 | Way . |
| 2,577,906 | 12/1951 | Miller et al. . |
| 2,624,380 | 0/0000 | Haynes . |
| 2,661,035 | 0/0000 | Ryals . |
| 2,662,561 | 12/1953 | Duncan, Jr. ........................... 143/43 |
| 2,664,119 | 0/0000 | Spearman . |
| 2,720,896 | 0/0000 | Le Tourneau . |
| 2,855,008 | 10/1958 | Long ..................................... 143/43 |
| 3,343,575 | 9/1967 | Trout .................................... 144/34 |
| 3,704,801 | 12/1972 | Stair ..................................... 144/34 |
| 3,818,957 | 6/1974 | Schoonover ......................... 144/34 |
| 3,872,901 | 0/0000 | Bernard . |
| 3,915,209 | 10/1975 | Denis .................................... 144/34 |
| 4,125,987 | 11/1978 | Krone et al. ......................... 56/13.3 |
| 4,270,586 | 6/1981 | Hyde et al. ........................... 144/336 |

FOREIGN PATENT DOCUMENTS

| | | |
|---|---|---|
| 88969 | 2/1904 | Canada . |
| 3246377 | 7/1932 | Canada . |
| 440992 | 4/1947 | Canada . |
| 449089 | 6/1948 | Canada . |
| 451280 | 9/1948 | Canada . |
| 898661 | 4/1972 | Canada . |
| 1029283 | 4/1978 | Canada . |
| 280090 | 4/1977 | U.S.S.R. . |
| 604542 | 4/1978 | U.S.S.R. . |

Primary Examiner—W. D. Bray
Attorney, Agent, or Firm—Biebel, French & Nauman

[57] ABSTRACT

This invention is directed to a method and apparatus for continuously harvesting trees to be used ultimately for lumber, pulpwood, and the like. The method comprises moving a tree cutting means through trees standing along the edge of a stand of trees in a continuous manner at a rate whereby the trees along the path taken by the tree cutting means are cut continuously and collected in a substantially parallel pattern on a trough-like means. The apparatus comprises a tree cutting means, means such as a power wagon for moving the cutting means through trees standing along the edge of the stand of trees, framework means for collecting and guiding the cut trees and depositing them in a substantially parallel manner on the trough-like means which is part of or accompanies the cutting means and the tree collecting and guiding means.

38 Claims, 8 Drawing Figures

SAW BLADE CONSTRUCTION USEFUL IN THE CONTINUOUS HARVESTING OF TREES

REFERENCE TO RELATED APPLICATION

This application is a continuation-in-part of our earlier copending application Ser. No. 090,832 filed Nov. 1, 1979, now abandoned.

This invention is directed to a method and apparatus for continuously felling trees and collecting the felled trees. More particularly, this invention is directed to a method of continuously felling trees by using a tree cutting and tree collecting and guiding mechanism mounted on a powered vehicle, the cut trees being deposited in a substantially parallel manner on a trough-like means which accompanies the powered vehicle.

BACKGROUND OF THE INVENTION

Companies engaged in the lumber and pulp and paper business for economical reasons are constantly striving to develop new methods and improve existing methods of harvesting trees from timber stands.

At present, using current mechanical harvesting methods, it is usually uneconomical to harvest trees measuring four to nine inches in butt diameter that typically grow in relatively flat sometimes marshy areas located in Northern regions. This size of tree may be mixed in with larger diameter trees. The only feasible method of cutting such trees in these areas is by means of hand operated chain saws. However, this method is labour intensive, which is undesirable for the following reasons. First, on average, labour time per tree is high because it normally takes one man using a chain saw at least one minute to harvest an eight inch diameter tree. Moreover, working conditions for the chain saw operator are often uncomfortable because there is often excessive cold in the winter time, there are usually excessive biting insects, heat, and humidity in the summer time, and the chain saw operator experiences back fatigue because bending over is required to cut the trees, and the chain saw operator over a long period of time may develop "white hands" which is a term for permanent loss of feeling in the hands and is believed to be caused by a workman gripping a vibrating object, such as a chain saw, for a number of hours each day over a prolonged period of time.

Further, it is necessary to pay much higher rates to piece workers in small trees for equal wood volume produced. On day rates, less wood volume is produced for a day's pay. This system of compensation favours the cutting of larger trees, and hence the smaller trees are avoided because they are unprofitable to cut.

Finally, there is an increasing shortage of good manpower in the "bush" because most people now prefer to work in urban areas. As a result, many potentially useful stands of timber including trees with diameters measuring four to nine inches, and often larger diameters, are not being harvested.

In Canadian Pat. No. 1,029,283, granted April 11, 1978, to Prince Albert Pulpwood Ltd. and identifying two of the inventors (Bruce Hyde and Wayne Tyndall) named in connection with the present invention, there is disclosed and claimed a low manual labour method and apparatus whereby trees mainly measuring from about four inches to nine inches in butt diameter, but including trees with butt diameters smaller than four inches or larger than nine inches, can be continuously and economically harvested by moving a tree cutting means mounted on a moving means such as a powered wagon through trees standing along the edge of a stand of such trees. The trees are harvested by cutting a swath of such trees using the apparatus at a velocity and in a manner whereby the cut trees topple in the swath path in a substantially parallel pattern.

While the invention disclosed and claimed in Canadian Pat. No. 1,029,283 enables trees to be harvested at unprecedented rates, it has been found that non-vertical trees, high wind conditions and high cutting speeds can be adverse factors and it would be advantageous if it would be possible to control the movement of the toppling trees after they have been cut.

SUMMARY OF THE INVENTION

We have now invented a novel improvement to the basic method and apparatus disclosed and claimed in Canadian Pat. No. 1,029,283. The improvement includes means for guiding and collecting the cut trees to reduce or eliminate the loss of erratically behaving trees and the effect of adverse wind conditions. The method we have invented comprises moving tree cutting means through trees standing along one edge of a stand of trees in a continuous manner at a rate whereby the trees along the path taken by the cutting means are cut continuously and the cut trees are continuously collected by a tree collecting and guiding means and deposited in a substantially parallel, bunched pattern on a trough-like means (buncher) which accompanies the tree cutting and collecting means. The cutting means can be one or more saw blades but preferably it is a large rotating horizontally disposed circular saw blade.

More particularly, the method of felling trees according to the invention comprises moving a power driven tree cutting means along a path through trees standing along one edge of a stand of trees by means of a mobile power unit. The tree cutting means severs the trees in the path from their roots in a plane substantially parallel with the ground as the means moves continuously forwardly along the path. A force is applied adjacent the butt ends of the cut trees to move the butt ends of the severed trees forwardly in the direction of travel of the mobile power unit. The force applied is of sufficient magnitude to move the butt ends of the trees forwardly in the direction of the advancing cutting means at a rate which causes the bodies of the severed trees to tend to topple rearwardly in comparison to the direction of travel of the cutting means in a substantially uniform direction. The trees as they are cut are continuously fed rearwardly to the direction of travel of the cutting means along a cut tree collecting and guiding means and then collected into bundles of substantially parallel cut trees that are deposited on a trough-like means which accompanies the mobile power unit and the cut tree collecting and guiding means.

The cut trees collected on the trough-like means can be deposited on the ground at periodic locations on or along-side the path travelled by the moving cutting means and mobile power vehicle means. The bundles of cut trees can be delimbed while they are lying on or beside the swath path and can then be removed from the swath path by some suitable means such as a front end pick-up. Alternatively, the bundles of cut trees can be removed from the swath path by means such as a front end pick-up for delimbing of the cut trees at another site. As a further alternative, the cut trees can be assembled into large bundles (i.e. full loads) and transported to an intermediate landing or central processing point without the need of another forwarding or off-loading machine.

The moving tree cutting means is caused to advance through the trees standing along the edge of a stand of trees at a velocity that is sufficiently high to tend to cause the cut trees to topple essentially rearwardly in comparison with the direction of travel of the cutting means. The tree cutting means when it is a circular saw blade should rotate at a rate which efficiently cuts the trees standing ahead in the path of the advancing saw blade. A circular saw rotation rate in the neighborhood of 900 r.p.m. has been found satisfactory but lower and higher rates are possible, so long as the trees are cut efficiently and cleanly so that there is minimum damage to tree butts and the trees are not pushed forwardly by the advancing cutting means. Various shapes, types, sizes and numbers of saw teeth can be used to suit various cutting requirements depending on types of trees to be cut, size of kerf to be cut, saw blade velocity and rate of travel of the saw through the trees. Different types of saw teeth may require different cutting speeds for optimum operation.

While we do not wish to be limited to any specific theories, it seems that in order to successfully enable continuous forward motion of the cutting means through a stand of trees at a forward velocity sufficient to cut the trees efficiently and to cause the cut trees to tend to topple rearwardly, the cutting means must have power sufficient that it does not lose appreciable cutting speed or forward velocity during the time it is physically cutting a particular tree. The power required to accomplish this can be substantial. A circular saw blade appears to lend itself very well to fulfulling this requirement. The rotating circular saw blade, particularly if it is of relatively heavy construction, has the ability while it is travelling from one tree to the next to store within itself substantial kinetic energy in the form of rotational or "fly wheel" energy. This stored kinetic energy can be tapped during the fraction of a second that is required by the saw to cut through the butt of a tree at the forward velocities necessary to cut the trees efficiently and tend to topple the cut trees rearwardly to the direction of travel of the cutting means.

The apparatus used for continuously felling the trees in the manner described comprises tree cutting means, means for moving the cutting means through the stand of trees at a rate whereby the trees are cut efficiently and tend to topple rearwardly, cut tree collecting and guiding means and trough-like means which accompanies the cutting means and the tree collecting and guiding means.

More particularly, the apparatus for felling trees comprises a tree cutting device having a power driven tree cutting means, means for moving the tree cutting means along a path through the trees standing at the edge of a stand of trees at a velocity sufficient to cause the cut trees to topple rearwardly in comparison with the direction of travel of the cutting means, power means for driving the tree cutting means to sever the trees standing in the cutting means path from their roots as the cutting device moves continuously forwardly along the path, means carried in association with the tree cutting means for collecting and guiding the cut trees so as to cause the severed trees to move and topple rearwardly, with reference to the direction of travel of the cutting means, in a substantially uniform direction, and optional means mounted on the top of the cutting means for briefly engaging and guiding the butt ends of the cut trees.

When the tree cutting means is one or more saws which can be disposed horizontally, the one or more saws can be connected to a cutting means mover such as a power wagon which drives the one or more saws and moves them through the stand of trees at a predetermined height above the ground. The one or more saws can be maintained at a predetermined height above the ground by any suitable means such as mounting the one or more saws on or in association with one or more skids or wheels of predetermined height, or height location by ground sensors, or the like. A wheel has proven to be an acceptable means of advancing over the ground and holding the saw at a predetermined height. The one or more saws can be located at any suitable position on the power wagon, for example, to one side of the power wagon and can be mounted on at least one skid or wheel.

The one or more saws can be pivotally connected to the power wagon by means such as a beam or connecting hinge which permits limited vertical movement between the saws and the power wagon. The one or more saws can also be located to one side at the rear of the power wagon, if required. The type, size, arrangement and shape of the cutting teeth on the saws can be varied to suit the types of trees that are being cut and the cutting speeds of the saws. The one or more saws may also be mounted in association with the power wagon so that the saws can be moved laterally in comparison to the power wagon.

When the tree cutting means is a rotating circular saw it is preferable that the leading edge of the saw that cuts the trees is moving laterally to the direction of travel of the advancing saw towards the stand of trees and then at the side edge of the saw closest to the trees is moving in a rearwardly direction so that the top surface of the saw itself at the side closest to the trees tends to briefly grip and guide the butts of the cut trees in a direction rearwardly to the direction of advance of the saw blade.

The top surface of the saw blade may be smooth or may have thereon bars, projections, spikes, ridges, or the like, which, when the saw blade is rotating, tend to briefly engage and guide the butt ends of the cut trees rearwardly to the direction of travel of the cutting blade.

A cut tree collecting and guiding means may be mounted above or behind the one or more tree cutting means to collect and guide the trees as they are cut. The cut tree collecting and guiding means can be accompanied by a trough-like means for receiving the cut trees from the cut tree collecting and guiding means so that the cut trees can be collected on the trough-like means in a substantially parallel bunched manner.

The cut tree collecting and guiding means can include a tree compeller means which forces the trees confronted by the apparatus to either be cut and collected by the cut tree collecting and guiding means or to pass beside the cutting means and the cut tree collecting and guiding means. The compeller contacts a tree standing on the border line between the swath path and the remaining stand of trees and as the apparatus moves forward deflects to the outside of the tree to compel it to be cut or deflects to the inside of the tree so that the tree is not cut. The compeller can be mounted on the saw frame so that it can deflect to the left or the right side of a tree and thereby determine if a tree should be cut or not be cut. The compeller prevents trees being partially cut. If a tree is partly severed there is always a great risk that it will fall uncontrolled after the machine has passed, due to its own weight, wind, or the like. The end of the compeller can be rigid or resilient and should preferably be rounded. It is important that there is sufficient vertical space between the compeller and the saw to facilitate the rejection as much as possible of incoming debris, broken pieces of wood, brush, and the like to avoid jamming or clogging of the saw. Stands of trees always seem to have debris, brush, etc., on the ground and it is not possible to completely stop the debris from entering the saw area. To keep the saw area clear so that the saw can function efficiently, it is advantageous to keep the rear part of the saw frame and the cut tree guiding means as low as possible to permit the debris that has entered the tree gate and guiding area to be pushed rearwardly out over the rear frame threshold of the saw supporting frame by the incoming cut trees. The tree compeller means can be mounted at the leading edge of the cut tree collecting and guiding means away from the power tractor side of the cut tree collecting and guiding means. A tree guard can be installed on the power wagon to prevent cut trees from toppling on the power wagon.

A cut tree persuader (tree pusher) can be used in association with the cut tree collecting and guiding means to assist moving the cut trees rearwardly and to discourage the trees toppling forwardly ahead of the forwardly advancing cutting means.

The tree pusher (persuader) catches the uncut trees deflected by the compeller and starts pushing them rearwardly. The saw severs the tree from the stump. The friction between the butt end of the cut tree and the rotating saw together with the persuader transports the tree rearwardly in a practically vertical position through the tree gate (the space between the tree guiding means and the persuader). The butt end of the cut tree is moved forwardly with the speed of the wagon whereas the centre of gravity of the cut tree remains still. Consequently, the cut trees have a tendency to fall rearwardly provided they were originally in a substantially vertical position.

The persuader straightens up trees leaning in a forward direction and pushes them in the desired direction as well as giving the trees a higher falling speed. The persuader can be any kind of suitable cut tree pushing or guiding device such as a conveyor belt with pusher arm attachment or a rotor with one or several pusher arms.

The cut tree collecting and guiding means can include at the rear a cut tree collecting trough or pan followed by a cut tree butt fulcrum point which is contacted by the butt end of the cut trees and causes the cut trees to pivot about the fulcrum point and to topple rearwardly in an accelerated manner.

It has been found that it is important that the trees have a free fall as long as possible before they hit a fulcrum point at the front of the trough means which can be termed a collecting trough. The cut trees should preferably have an angle between themselves and a horizontal line of the order of 10°-15° when the cut trees hit the fulcrum point. If this angle is too large (say 30°-40°) there is a risk that the cut tree will slide forwardly thereby causing the butt of the cut tree to be cut off once again by the saw (at an angle) and generally obstructing the cutting edge of the saw.

The trees topple rearwardly and hit the inwardly sloping fulcrum point on the collecting trough and simultaneously slide sideways while lifting the butts away from the butt pan of the saw frame, which is located immediately behind the saw.

The stump height left by the saw can be controlled by a wheel which can have a spring suspension to reduce the risk of heavy loads on the saw blade due to "binding" if the wheel hits a stump while the saw is cutting through large trees. The wheel also lifts the saw over windfalls and other obstacles which otherwise would enter the saw.

The tree cutting method disclosed can be used on almost any terrain ranging from flat to rolling hills, so long as the cutting means can be moved over the terrain to achieve the desired effect. The method would not be suitable for tree bearing terrain that is so rough and uneven that it is not possible to move the cutting means by some means over the terrain.

DRAWINGS

DETAILED DESCRIPTION OF THE INVENTION

Figure 1:
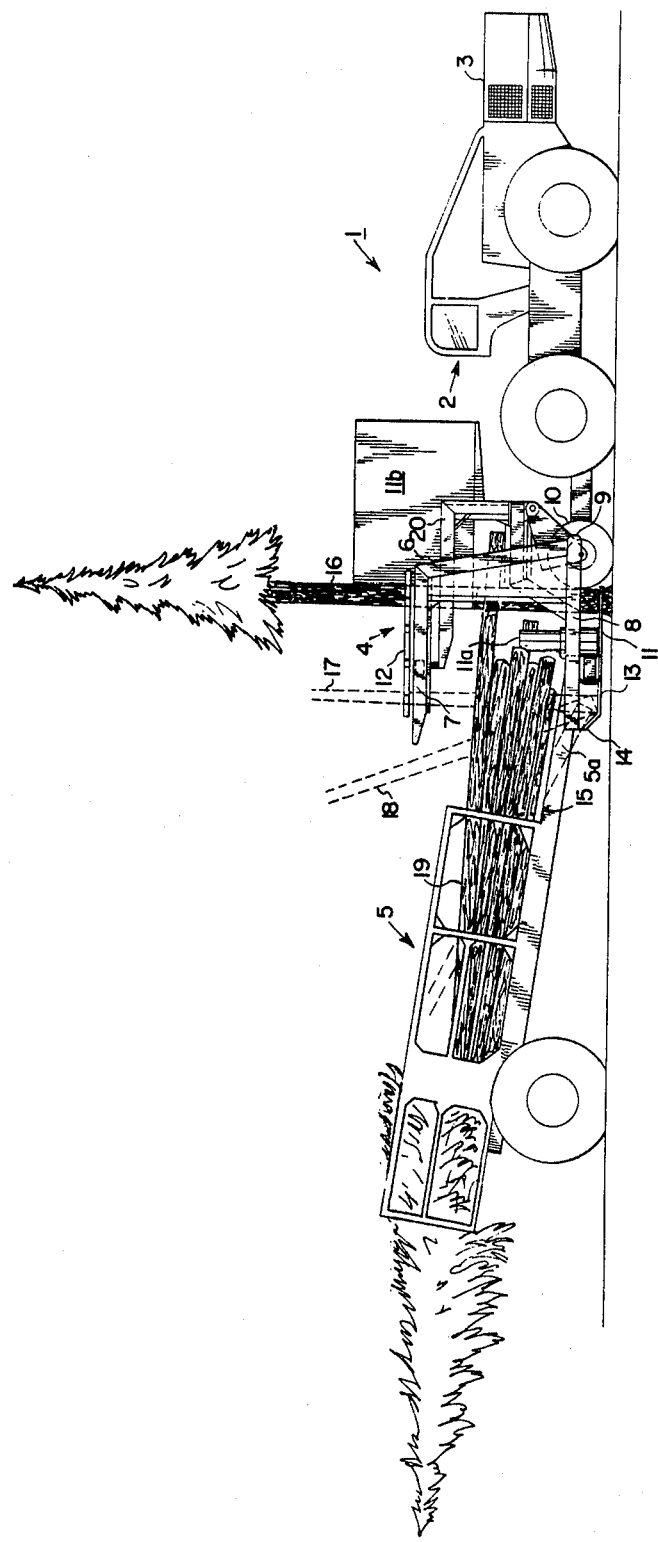
FIG. 1 is a side view of the power wagon, cutting blade, cut tree collecting and guiding means, and trough means.

FIG. 1 illustrates a side view of the A-line swather 1-buncher comprising a skidder 2, a fuel tank 3 mounted at the front of the skidder 2, frame 4 forming the cut tree collecting and guiding means, and a (buncher) trough means 5. The skidder 2 can be a power wagon that is widely used in the forest harvesting industry and is identified with the trade mark CLARK No. 668 SKIDDER. These skidders are manufactured in St. Thomas, Ontario, Canada. The fuel tank 3 mounted at the front of the skidder 2 provides a counterweight to the weight of the frame 4 and trough means 5. The skidder pulls a trailer comprising a main beam coupled at one end to the skidder and secured at its opposite end to a rear axle upon which the wheels of the trailer are mounted.

The frame 4 of the cut tree collecting and guiding means consists of an upper cut tree guiding bar 7, a lower horizontal compeller support bar 8, the upper bar 7 being supported above the lower bar 8 by a single rearwardly inclined support bar 6. The bar 6 is inclined rearwardly so that it will not contact and interfere with uncut inclined trees—otherwise there may be a tendency for the bar 6 to "bull-doze" over a slanted uncut tree. A compeller 9 is mounted at the front of the lower bar 8. The purpose of the compeller is to force trees that it encounters to pass on one side or the other of the compeller 9. The frame 4 rides on an extra stump height control wheel 10, the position of which can be adjusted vertically so that the frame 4 rides at a predetermined height. The frame 4 comprising bars 6, 7 and 8 forms a unitary structure which is carried somewhat like a "wing" on one side of the main beam of the trailer.

The frame 4 is mounted about and above a horizontally disposed circular saw 11, which is driven by a saw power drive 11a. The power drive 11a is a hydraulic motor which is driven hydraulically by a hydraulic system 11b mounted on the trailer. The hydraulic system 11b is mounted on two parallel auxiliary beams (not shown) orthogonally secured to the main beam of the trailer on the opposite side from the frame.

Mounted at the top of frame 4 above the upper bar 7 is a cut tree persuader 12. This persuader 12 is constructed somewhat like an endless belt which is carried around two sprockets, a drive sprocket 12a and an idler sprocket 12b (see FIG. 2). The belt has a series of spaced arms 12c. The persuader 12 assists in guiding cut trees through the frame 4. Alternatively, the persuader can be a rotating wheel with arms that guide the cut tree.

A butt pan 13 is located laterally and behind the power drive 11a and the saw 11. A fulcrum plate 14 is mounted laterally across the back of the pan 13. This plate 14 contacts the butts of the cut trees and provides a pivotal point for the butts of the cut trees as they topple rearwardly. A second fulcrum edge 15 is located at the front of the trailer 5. This second fulcrum edge 15 provides a second priotal point for the rearwardly toppling cut tree.

As is depicted sequentially in FIG. 1, when the skidder 2, the frame 4, the rotating circular saw blade 11, and the trough 5 are moving in a forward direction, the rapidly rotating saw blade 11 cuts tree 16 from its roots at a location proximate to the ground (tree 16 is shown in the position at which it is located shortly after it has been cut). The cut tree 16 is then, because of the forward movement of the skidder 2 and the saw blade 11, forced relatively speaking to move rearwardly in relation to the forward advancement of the saw blade 11, and this relative movement tends to cause the tree 16 to tend to topple in the rearward direction. The cut tree 16 moves rearwardly along the top surface of the saw blade 11 until it reaches the tree position shown as position 17. At that point, the tree is above the pan 13 and has toppled only slightly in a rearward direction. As the skidder 2 and saw blade 11 continue to move forwardly, the butt of the cut tree in position 17 contacts fulcrum plate 14 and this causes the cut tree to topple rearwardly to a greater degree until it reaches the position shown as position 18. In other words, the cut tree butt in its falling motion pivots about fulcrum 14. The tree at position 18 continues to fall rearwardly until the tree reaches position 19. At position 19, the cut tree contacts a pivot point 15 at the leading edge of the trough 5. Once the falling tree reaches position 19, the majority of its weight is to the rear of pivot point 15 and the tree then pivots quickly about point 15 to a nearly horizontal position on the trough 5. At the same time, the butt of the cut tree is lifted clear of fulcrum 14. Fulcrum 14 should be at an angle of about 10° to 15° to the horizontal for proper function.

Figure 2:
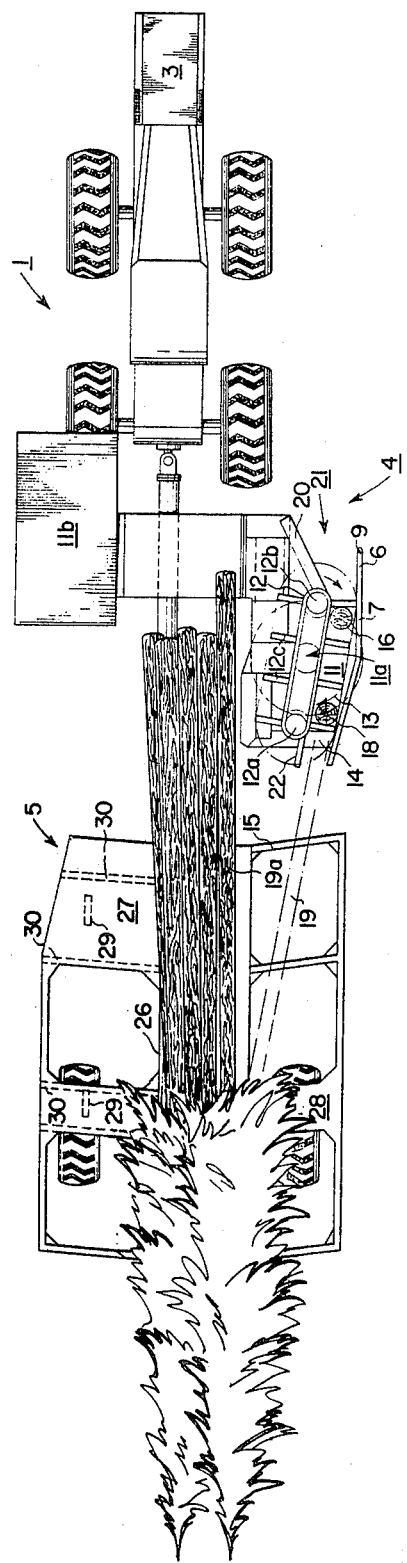
FIG. 2 is a top view of the power wagon, cutting blade, cut tree collecting and guiding means, and trough means.

As can be seen in FIG. 2, which illustrates a top view of the A-line swather 1, persuader 12 consists of a series of arms 12c travelling on a belt about two sprockets 12a and 12b. The function of the persuader 12 is to contact the cut tree as it is cut by the saw blade 11 and assist in causing the cut tree to move in a rearwardly direction to position 17 as shown in FIG. 1. The persuader 12 can be operated at any one of a number of speeds as required in order to co-ordinate its movement with the speed of advancement of the skidder 2 and cause the cut trees to move smoothly in a rearwardly direction along the top surface of the saw 11 and on to butt pan 13.

FIG. 2 also illustrates clearly the function of the compeller 9. As can be seen, any trees that meet the compeller 9 are forced to pass to one side or the other of the compeller 9. Those trees that pass on the inboard side of compeller 9 (as seen from above in FIG. 2) necessarily will meet and be cut by the rotating circular saw 11. Any trees that pass on the other side of compeller 9 (as seen from above in FIG. 2) will not be cut and will continue to stand until the A-line swather 1 makes a second pass along the edge of the stand of trees adjacent the path cut by the swather 1 in its current pass.

FIG. 2 also illustrates guide bar 20 whose function is to meet uncut trees and guide them into the mouth of tree gate of the frame 4 (illustrated by the number 21). Any trees which enter the tree gate 21, which are undesirable from the point of view of the operator of the skidder, can be rejected by quickly reversing the rotational direction of the persuader 12. The operator of the skidder simply stops or slows down the skidder 2, reverses the rotational direction of the persuader 12, so that it moves in reverse (left to right as shown in FIG. 2) and the undesirable tree is automatically rejected.

All cut trees after passage through the tree gate 21 pass between persuader 12 and upper bar 7 from right to left as illustrated in FIG. 2.

When a cut tree is at position 18, it has contacted fulcrum 14 (seen more readily in FIG. 1) and subsequently second pivot point 15 (position 19 in FIGS. 1 and 2). At that point, the cut tree has toppled to an almost horizontal position, and second pivot point 15 (which slopes inwardly to the centre of the trough 5) causes the cut tree to roll to the centre of the trough as shown by tree position 19a.

A direction bar 22 (which is concealed directly behind upper bar 7 in FIG. 1 but can be seen partially in FIG. 2) underlies the persuader 12 and prevents the cut trees from toppling in the direction of the skidder before they have reached position 18. By that time, the cut trees are toppling rearwardly. The combination of the upper bar 7, and the direction bar 22, provide an opening only to the rear of the frame combination 4, and this ensures that the cut trees topple in a rearwardly direction only. Accordingly, the cut trees are forced to topple onto the trough 5.

The area below the rear portion of the upper bar 7 and the direction bar 22 can be described as a butt exit threshold area. It is important for the proper and smooth functioning of the overall cut tree collecting and guiding frame combination 4, 12 and 22, and the saw 11, that the butt exit threshold area be kept as low to the ground as possible. Lowness at this area ensures that the butt ends of the cut trees will not be contacted or interfered with by parts of the frame 4, persuader 12 and can be readily tipped off the saw blade 11 and the pan 13, and caused to smoothly exit from the frame and exit thresold area on to the trough 5 and then be rolled to the centre section 26 of the trough 5.

As can also be seen in FIG. 1, the area below the upper bar 7, and the lower bar 8, and the area between the lower bar 8 and the saw 11 are very open with no obstructions, supporting bars, or the like. This open configuration provides numerous exit points and ensures that pieces of wood, bark, brush, and other debris, do not become jammed within the frame 4 and on the saw 11, thereby interfering with the smooth operation of the swather.

The trough 5 (as seen in FIG. 2) consists of a generally flat planar trough bottom 26, which has on either side upwardly tilting side frames 27 and 28. Side frame 27 may to tiltable, while side frame 28 may be rigidly mounted. Both side frames 27 and 28 slope downwardly and inwardly from the outsides of the trough in the direction of the trough bottom 26 in the centre of the trough. This encourages the cut trees to roll to the centre of the trough 5, rather than fall off the side of the trough 5 as the trough 5 moves over rough ground. As an alternative, the trough 5 can be constructed so that the cut trees are ejected or dropped through the trough bottom 26.

Both side frames 27 and 28 have therein open areas which tend to receive the branches of the cut trees (shown in positions 19 and 20), and which permit those trees to roll downwardly and inwardly in the direction of the trough bottom 26. Side frame 27 is mounted about an axis on hinges 29, which enable the side frame 27 to be tilted outwardly and laterally from the trough bottom 26. This permits cut trees carried by the trough to be dumped off the side of the trough 5 at desired times, so that the trough can be cleared to receive more cut trees. The tiltable side frame 27 is controlled by the operator of the skidder 2 so that cut trees can be dumped from the trough on command.

To strengthen the overall trough construction, optional ribs 30 can be fastened or welded to the side frames 27 and 28. If the optional ribs 30 are welded on the top surfaces of the side frames 27 and 28, they form ridges which assist in preventing the cut trees carried by the trough 5 from moving in a forwardly direction, as the trough is pulled and bumped along over the generally uneven terrain travelled by the skidder 2.

Figure 3:
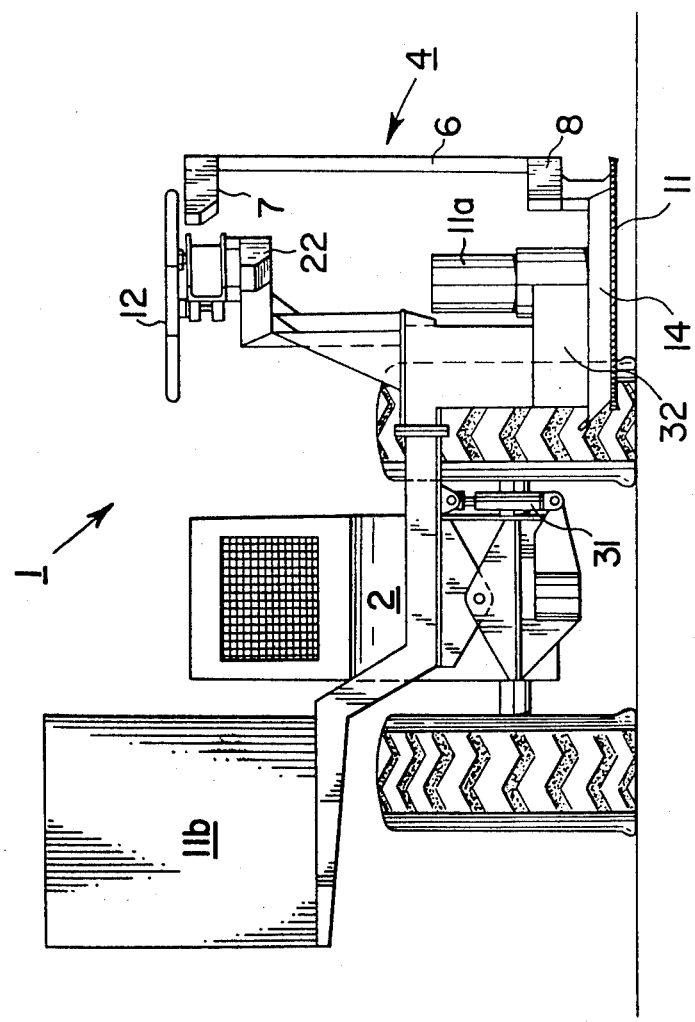
FIG. 3 is a rear view of the power wagon and the cut tree collecting and guiding means, and cutting blade.

FIG. 3 illustrates a rear view of the swather 1. The persuader 12 is mounted at the top of the overall cut tree collecting and guiding frame 4 and rotates above upper bar 7 and guide bar 22 to assist in guiding the cut trees rearwardly (towards you as seen in FIG. 3). The first fulcrum 14, by providing a pivot point for the cut trees assists in inducing the cut trees to topple rearwardly. A butt plate 32 mounted generally behind the power drive unit 11a, protects the power drive unit 11a from the butt ends of the cut trees.

The height of the overall frame combination 4 and the saw blade 11, can be adjusted relative to the height of skidder 2 and the trailer by means of cylinder 31. To assist in balancing the weight caused by mounting the frame combination 4 and the saw blade 11 on one side of the trailer and the skidder 2, the hydraulic system 11b, consisting of an engine and a hydraulic pump combination, is mounted on the opposite side of the trailer and the skidder 2. The hydraulic system 11b provides the power to the saw blade 11 to ensure that it maintains rotational speed at all times and is not unduly slowed down in rotational speed when it encounters a relatively large diameter tree, or encounters some other resistant object such as a rock or the like lying in the path of the saw blade 11. Counterbalancing the weight between the hydraulic system 11b and the frame combination 4 and saw blade 11, permits the skidder 2 to be more easily controlled by the operator of the skidder. Furthermore, the fuel tank 3, mounted at the front of the skidder 2, assists in providing an overall balance with the downward weight exerted at the rear of the trailer by the trough 5 and trough tow bar 5a.

Figure 4:
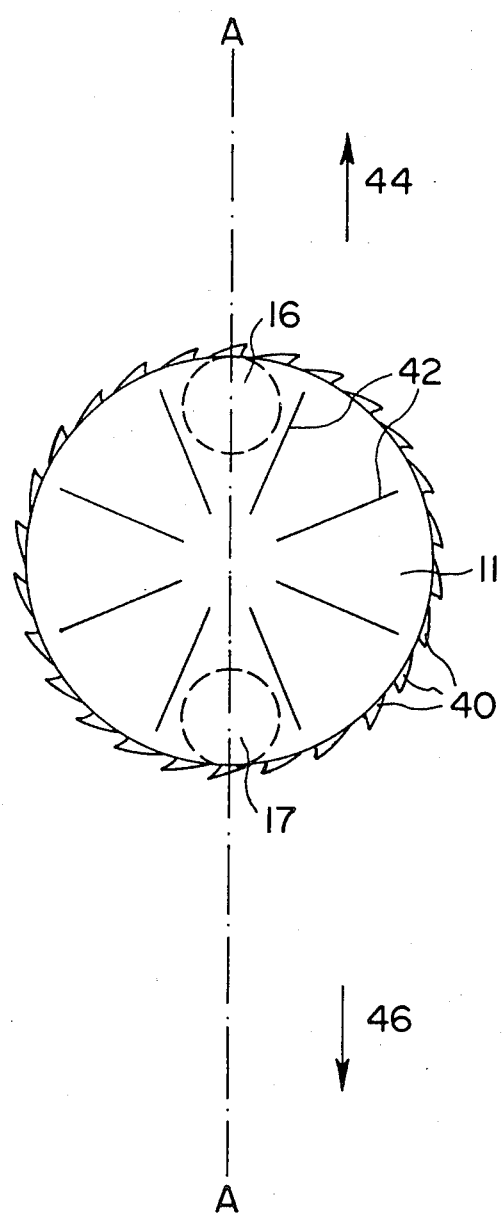
FIG. 4 is a top view of one embodiment of the saw blade of this invention.

FIG. 4 illustrates a top view of one embodiment of the saw blade of the present invention. Saw blade 11 is shown with a plurality of teeth or cutting edges 40 about its circumference. Ridges or projections 42 are affixed to the top surface of the saw blade. The projections or ridges may be constructed of metal and may be welded to the top of the saw blade. When in operation, the saw blade travels in the direction indicated by the arrow 44 and the cut tree travels in the direction indicated by the arrow 46. With reference to FIGS. 1 and 4, as the cut tree travels along the Path A—A from position 16 to position 17, the projections or ridges tend to briefly engage and guide the butt end of the cut tree rearwardly to the direction of travel of the saw blade. The action of the projections or ridges in concert with the compeller 9, the compeller support bar 8, the cut tree guiding bar 7 and the cut tree persuader 12, tends to guide the cut tree rearwardly to the trough 5. It will be understood that the configuration of the projections or ridges may vary. For example, the ridges 42 may be crescent shaped. In addition, one concentric circular ridge may be used. It will also be understood that instead of projections or ridges, such elements as bars, spikes, and the like may be affixed to the top surface of the saw blade to perform the same function.

FIGS. 1–4 illustrate the preferred embodiment of the apparatus of the invention as of the filing date of the predecessor application (U.S application Ser. No. 090,832 filed on Nov. 1, 1979). Since that time, modifications have been made to the apparatus and FIGS. 5–8 of the continuation-in-part application illustrate the current preferred embodiment of the apparatus.

Figure 5:
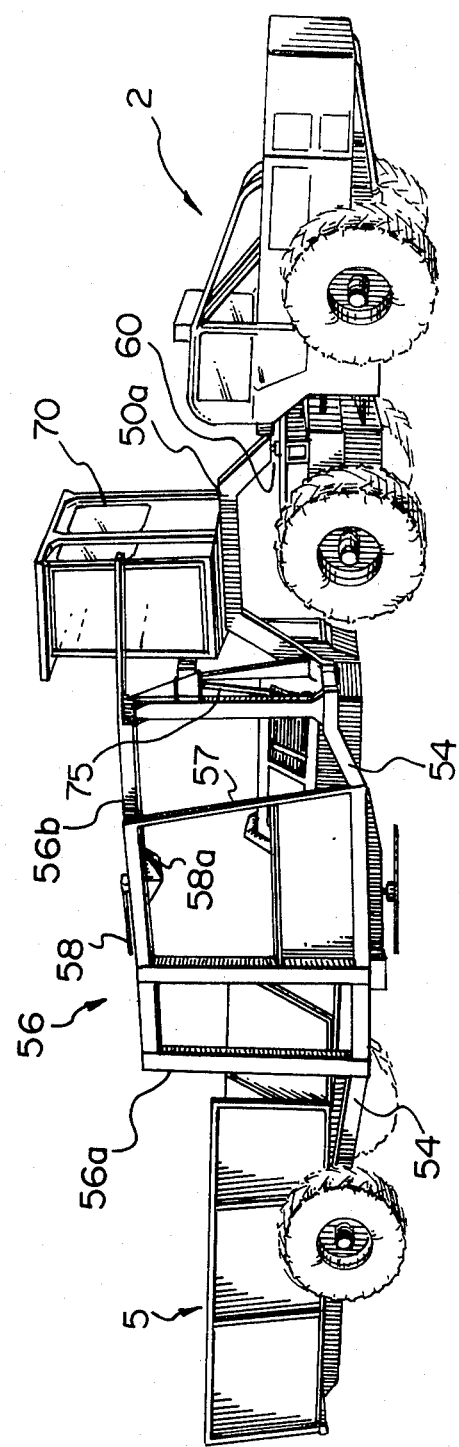
FIG. 5 is a side plan view of another embodiment of the apparatus of the invention.
Figure 8:
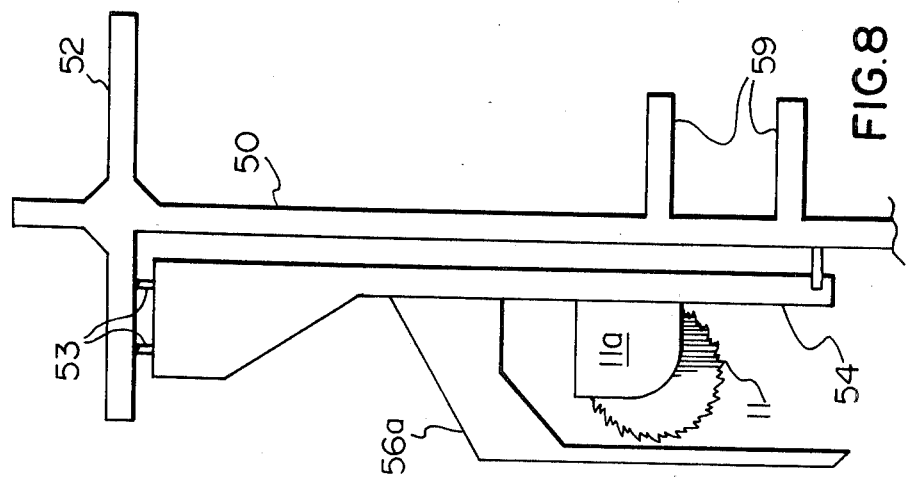
FIG. 8 is a schematic representation of the interrelationship of the main beam, the saw beam and the frame of the apparatus shown in FIG. 5.

FIG. 5 is a plan view of the current preferred embodiment of the apparatus of the invention and FIG. 8 illustrates the interrelationship of the main beam, saw beam and frame of the apparatus. The main beam 50 is secured at one end to the axle 52 of the trough means 5. The opposite end of the main beam forms a gooseneck connector 50a which is pivotally secured to the skidder 2 by a ball joint connection 60. The ball joint connection is preferably located forward of the axle of the rear wheels of the skidder to provide stability to the apparatus. The operator's cab 70 is mounted on the gooseneck connector.

The saw beam 54 is secured at one end to the main beam by a hydraulic cylinder 75 which is attached at one end to the saw beam and at its opposite end to a support beam 51 (see FIG. 6) which extends vertically from the main beam. The saw beam is hingedly secured at its opposite end to the axle 52 of the trough means by means of hinge connectors 53. The hydraulic cylinder and the hinge connectors allow the saw beam to be raised and lowered, relative to the main beam, by the operator.

Figure 7:
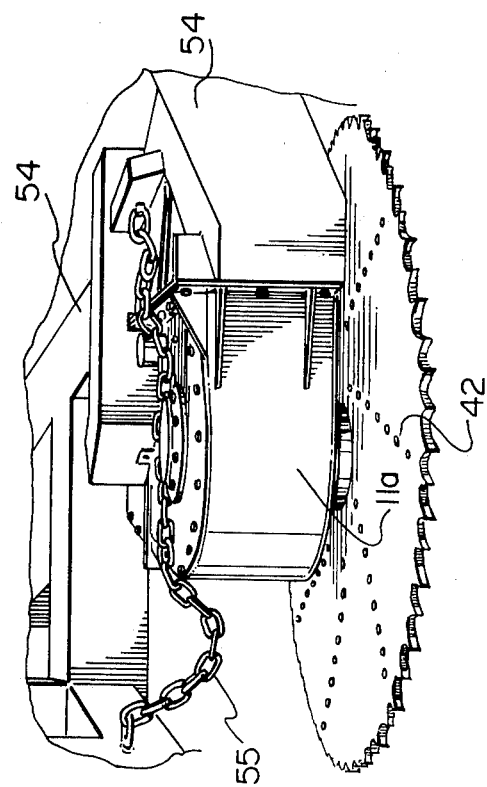
FIG. 7 is a detailed plan view of the saw blade of the apparatus shown in FIG. 5.

The saw beam is integrally connected to the saw power drive 11a which is secured to and drives the saw blade 11 (see FIG. 7). The projections 42 on the saw blade comprise rows of metal studs.

The frame 56 comprises an outer frame 56a and an inner frame 56b; both frames being secured to the saw beam. The frame defines a passageway for guiding cut trees into the trough means. The outer frame 56a serves as the compeller as its leading edge 57 directs a tree to be cut towards the saw blade. The inner frame has a cut tree persuader in the form of a single rotatable arm 58 (see FIG. 6) powered by a persuader power drive 58a.

By means of hydraulic controls, the operator can rotate the arm clockwise to guide cut trees towards the trough means or counterclockwise to reject a tree from the frame. A chain 55 (see FIG. 7) is attached above the saw blade between the saw beam and the outer frame to provide a fulcrum point to assist in toppling cut trees rearwardly towards the trough means. As a tree is cut by the saw blade, the projections 42 briefly grip and guide the butt of the cut tree inwardly towards the trough means. The cut tree is thus forced against the chain and the cut tree thereby tends to fall rearwardly. The arm 58 is rotated in a clockwise direction to push the cut tree rearwardly.

The engine or hydraulic system 11b which provides the power to operate (among others) the saw power drive, the persuader power drive and the hydraulic cylinder, is mounted on auxiliary beams 59 attached to the main beam (see FIG. 8). The engine also serves to counterbalance the weight of the saw beam and frame mounted on the opposite side of the main beam.

Figure 6:
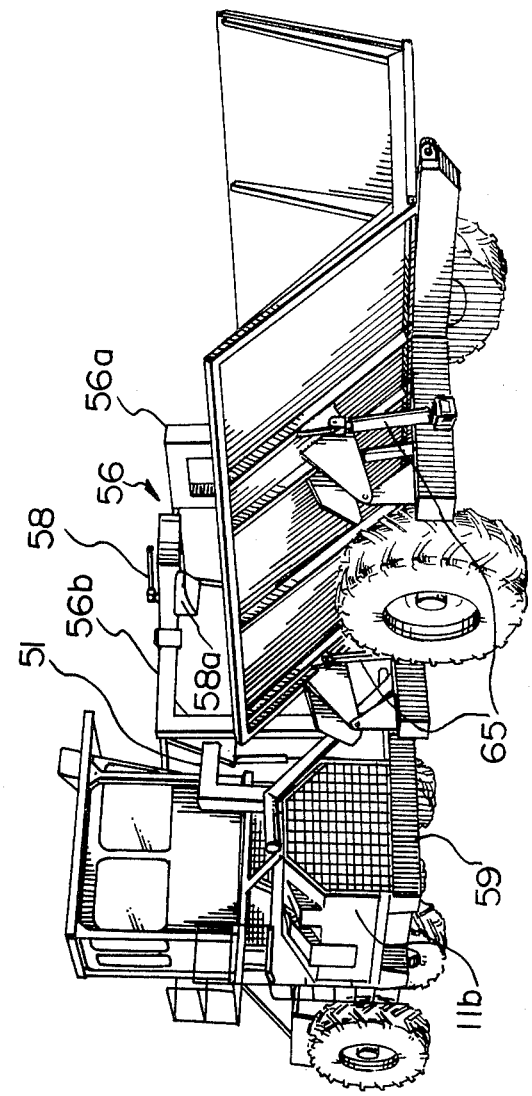
FIG. 6 is a rear plan view of the apparatus shown in FIG. 5.

As can be seen in FIG. 6, trough hydraulic cylinders 65 are connected between the main beam and the trough means. The operator may operate the trough hydraulic cylinders to raise one side of the trough means to dump a load of cut trees from the trough means.

It will be understood that the pivotal connection of the main beam to the skidder allows the apparatus to pivot about the point of connection to assist in either engaging or avoiding trees. The means by which the saw beam is connected to the main beam allows the operator to effectively raise and lower the saw blade to avoid rocks and the like or to position the blade for more efficient cutting of a tree. Unlike the first described embodiment of the apparatus of this invention, this embodiment does not require an adjustable stump height control wheel.

A further embodiment of the apparatus of the invention is contemplated wherein the apparatus would be an integral, possibly articulated, self-propelled vehicle (as opposed to a tractor-trailer combination) with a single, suitably located control cab from which a single operator would control all aspects of the operation of the apparatus. Such an embodiment would not require a separate skidder and could be operated by one operator.

Undoubtedly, obvious modifications and variants of the foregoing embodiments will readily occur to those skilled in the art. Accordingly, it is to be understood that the invention is not to be construed as restricted or limited to the particulars of the embodiments and proposals specifically described above, but is to be afforded the full scope defined by the accompanying and following claims.

The embodiments of the invention in which an exclusive property or privilege is claimed are defined as follows:

1. An apparatus for felling and harvesting trees standing along the edge of a stand of trees which comprises a tree cutting device having (a) saw means including a power driven horizontally disposed rotating circular saw blade, (b) vehicular means carrying the saw means for of advancing the saw means along a path of trees standing at the edge of a stand of trees, said saw means engaging said trees without pushing the trees when cut forwardly in relation to the direction of advancement of the saw means, (c) power means for driving the saw blade to sever trees standing in the path from their roots without pushing the trees forwardly as the cutting device moves continuously forwardly along the path, (d) cut tree collecting and guiding means carried by the vehicular means substantially along one side thereof and located at least in part adjacent the saw means for collecting trees and guiding severed trees to move and topple rearwardly in relation to the direction of advancement of the saw means in a substantially uniform direction, and (e) at least one projection located on the upper surface of the saw blade for briefing engaging and guiding rearwardly in relation to the direction of advancement the butt ends of the cut trees.

2. An apparatus according to claim 1 wherein said vehicular means comprises a vehicle operable to carry said saw blade and move it through the stand of trees at a predetermined height above the ground and a power unit carried by said vehicular means for driving said saw blade.

3. An apparatus according to claim 1, wherein the cut tree collecting and guiding means is accompanied by a trough which receives the cut trees from the cut tree collecting and guiding means whereby the cut trees are collected on the trough in a substantially parallel manner.

4. An apparatus according to claim 1, wherein the cut tree collecting and guiding means includes compeller means for assisting in directing trees towards said cut tree collecting and guiding means.

5. An apparatus according to claim 4, including cut tree persuader means for use in association with the cut tree collecting and guiding means for assisting in guiding cut trees through said cut tree collecting and guiding means.

6. An apparatus according to claim 1 wherein there are a plurality of projections comprising a series of ridges on the top surface of the saw blade.

7. An apparatus according to claim 6 wherein the ridges are positioned on the top surface of the saw blade so that they generally radiate outwardly from the centre of the blade.

8. An apparatus according to claim 7 wherein the ridges have a crescent shaped configuration.

9. An apparatus according to claim 1 wherein the cut tree collecting and guiding means incorporates at least one fulcrum point about which the cut trees can pivot while toppling rearwardly.

10. An apparatus according to claim 5, wherein the cut tree collecting and guiding means includes longitudinal bars along each side of the saw means and positioned substantially parallel to the direction of advancement of the saw means to assist in directing the cut trees rearwardly in relation to the direction of advancement of the saw means.

11. An apparatus according to claim 10 wherein the persuader means is operable in one direction for guiding the cut trees into the cut tree collecting and guiding means and is operable in the opposite direction for rejecting uncut trees from the cut tree collecting and guiding means.

12. An apparatus according to claim 11 wherein said persuader means includes an endless belt mounted on
    a drive sprocket and
    an idler sprocket;
for movement around said sprockets in either direction and having one or more arms extending outwardly to engage trees directed towards the saw means.

13. An apparatus according to claim 3 wherein the cut tree collecting and guiding means incorporates at least one fulcrum point about which the cut trees can pivot while toppling rearwardly.

14. An apparatus according to claim 12 wherein the cut tree collecting and guiding means incorporates at least one fulcrum point about which the cut trees can pivot while toppling rearwardly.

15. An apparatus according to claim 14 wherein said cut tree collecting and guiding means is a substantially rigid frame and said bars include an upper cut tree guiding bar, a lower horizontal compeller support bar and a rearwardly inclined support bar which supports said upper bar above said lower bar.

16. An apparatus according to claim 15 wherein said compeller is mounted near the front of said lower bar and said persuader means is mounted at the top of said frame above said upper bar.

17. An apparatus according to claim 16 wherein said vehicular means comprises a vehicle operable to carry said saw means and move it through the stand of trees at a predetermined height above the ground and a power unit carried by said vehicular means for driving said saw means.

18. An apparatus according to claim 17 wherein said vehicle carries said cut tree collecting and guiding means, said compeller, said persuader means and said trough.

19. An apparatus according to claim 18 wherein said vehicle is a trailer operable to be towed by a tractor unit.

20. An apparatus according to claim 19 wherein said tractor unit is a skidder.

21. An apparatus according to claim 20 wherein said saw power drive is driven hydraulically by a hydraulic system and said power drive and said hydraulic system are mounted on said trailer thereby maintaining said saw blade in a substantially horizontal position.

22. An apparatus according to claim 21 including a vertically adjustable stump height control wheel upon which said frame rides.

23. An apparatus according to claim 22 including a butt pan located laterally of and behind said power drive and said saw blade and further including a fulcrum plate mounted laterally across the back of said pan, said plate providing said one fulcrum point.

24. An apparatus according to claim 23 wherein said fulcrum plate is positioned at an angle of less than 15 degrees to the plane of said butt pan.

25. An apparatus according to claim 18 wherein said vehicle is an articulated vehicle.

26. An apparatus according to claim 25 wherein said articulated vehicle comprises a trailer and a tractor unit.

27. An apparatus according to claim 26 wherein said tractor unit is a skidder.

28. An apparatus according to claim 27 wherein said saw power drive is driven hydraulically by a hydraulic system and said power drive and said hydraulic system are mounted on said trailer and said saw blade is in a substantially horizontal position.

29. An apparatus according to claim 28 including a vertically adjustable stump height control wheel upon which said frame rides.

30. An apparatus according to claim 29 including a butt pan located laterally of and behind said power drive and said saw means and further including a fulcrum plate mountd laterally across the back of said pan, said plate providing said one fulcrum point.

31. An apparatus according to claim 30 wherein said fulcrum plate is positioned at an angle of less than 15 degrees to the plane of said butt pan.

32. An apparatus for felling and harvesting trees having a diameter greater than two inches standing along the edge of a stand of trees, said apparatus comprising
(1) a trailer having a main beam secured at one end to ground support means for movably supporting the trailer above the ground and connectable at its other end to self-propelled vehicular means for moving said trailer and having one or more auxiliary beams orthogonally secured to said main beam proximate said other end,
(2) a substantially rigid saw beam mounted on one side of said trailer, said saw beam being hingedly mounted at one end to the axle of the trailer and being mounted at its other end to the main beam of the trailer proximate said other end of the main beam,
(3) a horizontally disposed rotating circular saw blade mounted below said saw beam intermediate said ends of said saw beam, said saw blade having projections located on its upper surface for briefly engaging and guiding the butt ends of cut trees,
(4) a frame mounted on said one side of said trailer comprising
 (a) an outer generally rectangular frame mounted on said saw beam near said trailer, said outer frame extending above said saw beam and comprising a compeller for assisting in guiding trees towards said saw blade, and
 (b) an inner generally inverted L-shaped frame mounted on said saw beam near said other end of said saw beam, said inner frame extending above said saw beam generally parallel to said outer frame thereby defining a passageway through which cut trees can pass,
(5) a cut tree persuader mounted on said inner frame above said saw blade operable in one direction for guiding trees towards said saw blade and operable in the opposite direction for rejecting trees from said frame, said persuader comprising a rotatable arm,
(6) a saw power drive mounted to said saw beam above the saw blade, and
(7) a hydraulic system for providing hydraulic power to the saw power drive, said hydraulic system being mounted on said one or more auxiliary beams.

33. An apparatus according to claim 32 including a trough mounted on the trailer rearwardly of the saw blade, said trough having inwardly sloping sides and a fulcrum edge located near the front of said trough.

34. An apparatus according to claim 33 wherein said other end of the saw beam is mounted to the main beam by a hydraulic cylinder operable to raise and lower the saw beam and thereby adjust the vertical position of the saw blade.

35. An apparatus according to claim 34 wherein said ground support means is an axle having a wheel at either end and said vehicular means is a skidder.

36. An apparatus according to claim 35 wherein said other end of said main beam is a gooseneck member which is pivotally connected to said skidder above and forward of the rear axle of the skidder.

37. An apparatus according to claim 36 including an operator's cab mounted on said gooseneck member.

38. An apparatus according to claim 1, wherein the cut tree collecting and guiding means includes a butt pan located laterally of and behind the saw means.

* * * * *